United States Patent
Melton

(10) Patent No.: US 8,255,392 B2
(45) Date of Patent: Aug. 28, 2012

(54) REAL TIME DATA COLLECTION SYSTEM AND METHOD

(76) Inventor: Dan Melton, Kansas City, KS (US)

(*) Notice: Subject to any disclaimer, the term of this patent is extended or adjusted under 35 U.S.C. 154(b) by 39 days.

(21) Appl. No.: 12/803,443

(22) Filed: Jun. 25, 2010

(65) Prior Publication Data

US 2010/0332482 A1 Dec. 30, 2010

Related U.S. Application Data

(60) Provisional application No. 61/269,763, filed on Jun. 29, 2009.

(51) Int. Cl.
*G06F 17/30* (2006.01)

(52) U.S. Cl. ........ 707/723; 707/690; 707/706; 707/758; 707/919; 707/E17.018

(58) Field of Classification Search .................. 707/921, 707/919, 690, 758, 706, 723, E17.018
See application file for complete search history.

(56) References Cited

U.S. PATENT DOCUMENTS

| | | | | |
|---|---|---|---|---|
| 5,371,673 A * | 12/1994 | Fan | ................................... | 704/1 |
| 7,774,227 B2 * | 8/2010 | Srivastava | .................... | 705/7.34 |
| 7,848,765 B2 * | 12/2010 | Phillips et al. | ............. | 455/456.3 |
| 7,856,360 B2 * | 12/2010 | Kramer et al. | ................. | 705/1.1 |
| 7,925,982 B2 * | 4/2011 | Parker et al. | .................. | 715/748 |

* cited by examiner

*Primary Examiner* — Leslie Wong

(57) ABSTRACT

A computer implemented method for real time demographic or population data collection is provided. The invention accesses various social networks, mine and consolidate the data from theses sources into a common usable format. The data is sorted and aggregated for a geographic location. The data is then weighted from the first, second and third data sets based on the age of the data. A customer is provided with the real time interactive report including demographic data within the specified geographic location. The demographic data includes a confidence interval indicating the degree of likelihood that the demographic data is correct.

10 Claims, 5 Drawing Sheets

| SOURCE | ADDRESS | OCCUPIED | SCORE | DATE |
|---|---|---|---|---|
| 401 CABLE COMPANY | 613 SANDUSKY | YES | 1 | APRIL 2009 |
| 403 CITY | 613 SANDUSKY | NO | 0 | 2004 CITY CENSUS |
| 405 PHONE COMPANY | 613 SANDUSKY | YES | 1 | MARCH 2009 |
| 407 USPS | 613 SANDUSKY | NO | 0 | |
| 410 CREDIT BUREAU | 613 SANDUSKY | YES | 1 | APRIL 2009 |
| TOTAL | | | 3 | |

FIG 4

| SOURCE 402 | ADDRESS 420 | OCCUPIED | SCORE 430 | DATE 440 |
|---|---|---|---|---|
| 401 CABLE COMPANY | 613 SANDUSKY | YES | 1 | APRIL 2009 |
| 403 CITY | 613 SANDUSKY | NO | 0 | 2004 CITY CENSUS |
| 405 PHONE COMPANY | 613 SANDUSKY | YES | 1 | MARCH 2009 |
| 407 USPS | 613 SANDUSKY | NO | 0 | |
| 410 CREDIT BUREAU | 613 SANDUSKY | YES | 1 | APRIL 2009 |
| TOTAL | | | 3 | |

442
400

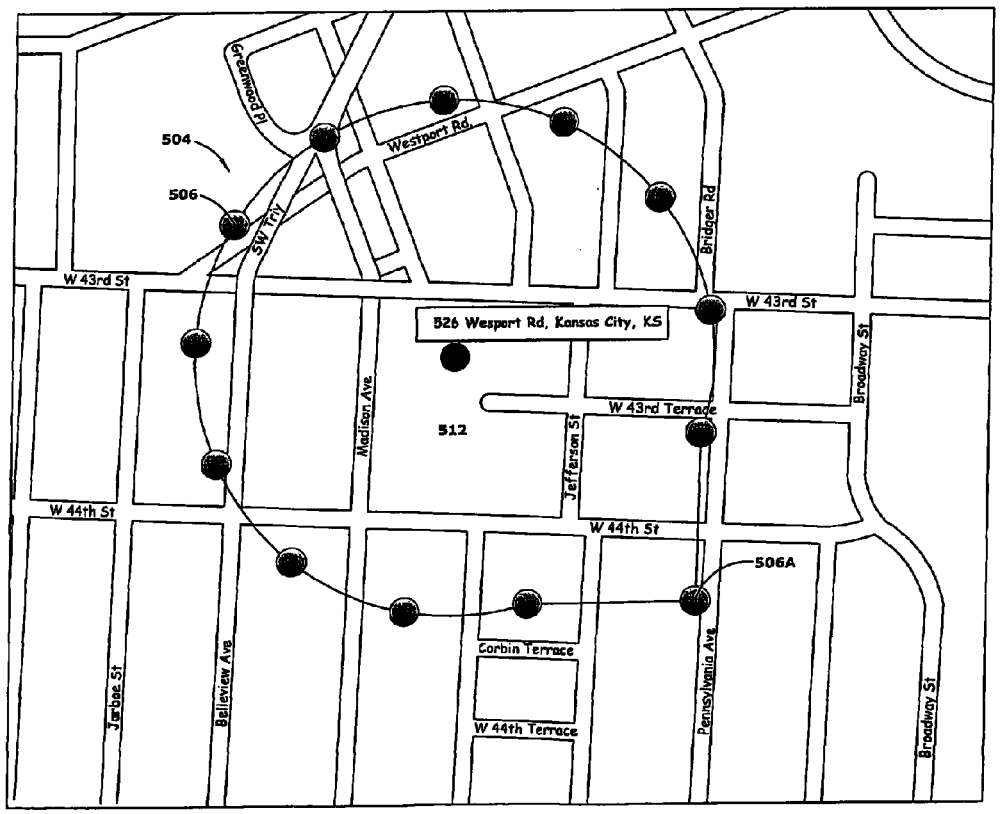

REAL TIME DATA COLLECTION SYSTEM AND METHOD

RELATED APPLICATIONS

This application claims the benefit of PPA Ser. No. 61/269,763 filed Jun. 29, 2009 by the present inventor which is incorporated by reference.

BACKGROUND OF THE INVENTION

There is a challenge in counting large numbers of people. Census data at best provides a view of the population at one point in time and historically tends to undercount many populations, especially in dense urban cores. The problem is compounded by migration over the 10-year passages of time between major population counts. Census data is crucial to allocation of government funds as well as determination of political boundaries; as such there is a need for techniques that provide a more reliable and timely count of population.

SUMMARY OF THE INVENTION

The computer implemented real time method for demographic, population or census data collection including the steps of:
- collecting a first data set and storing the first data at an Internet accessible location;
- providing access to the stored first data set through the Internet;
- storing a second data set provided by a customer computer,
- accessing a third data set responsive to a customer request;
- locating, interfacing with, storing and using social networking profile data based upon geography to inform population counts;
- sorting the first, second and third data sets by a first criteria wherein the first criteria is a geographic location such as by latitude and longitude;
- sorting the first, second and third data sets by a second criteria wherein the second criteria indicates age of the data sets;
- aggregating data for a common geographic location such as a city;
- weighting the data from the first, second and third data sets based on the age of the data;
- providing a report including demographic data about people within the location wherein the demographic data includes a confidence interval indicating the degree of likelihood that the demographic data is correct.

BRIEF DESCRIPTION OF THE DRAWINGS

FIG. 4 shows an example of data use;
and
FIG. 5 show a screen shot of a step in the process.

DETAILED DESCRIPTION OF THE DEVICE

Figure 1:
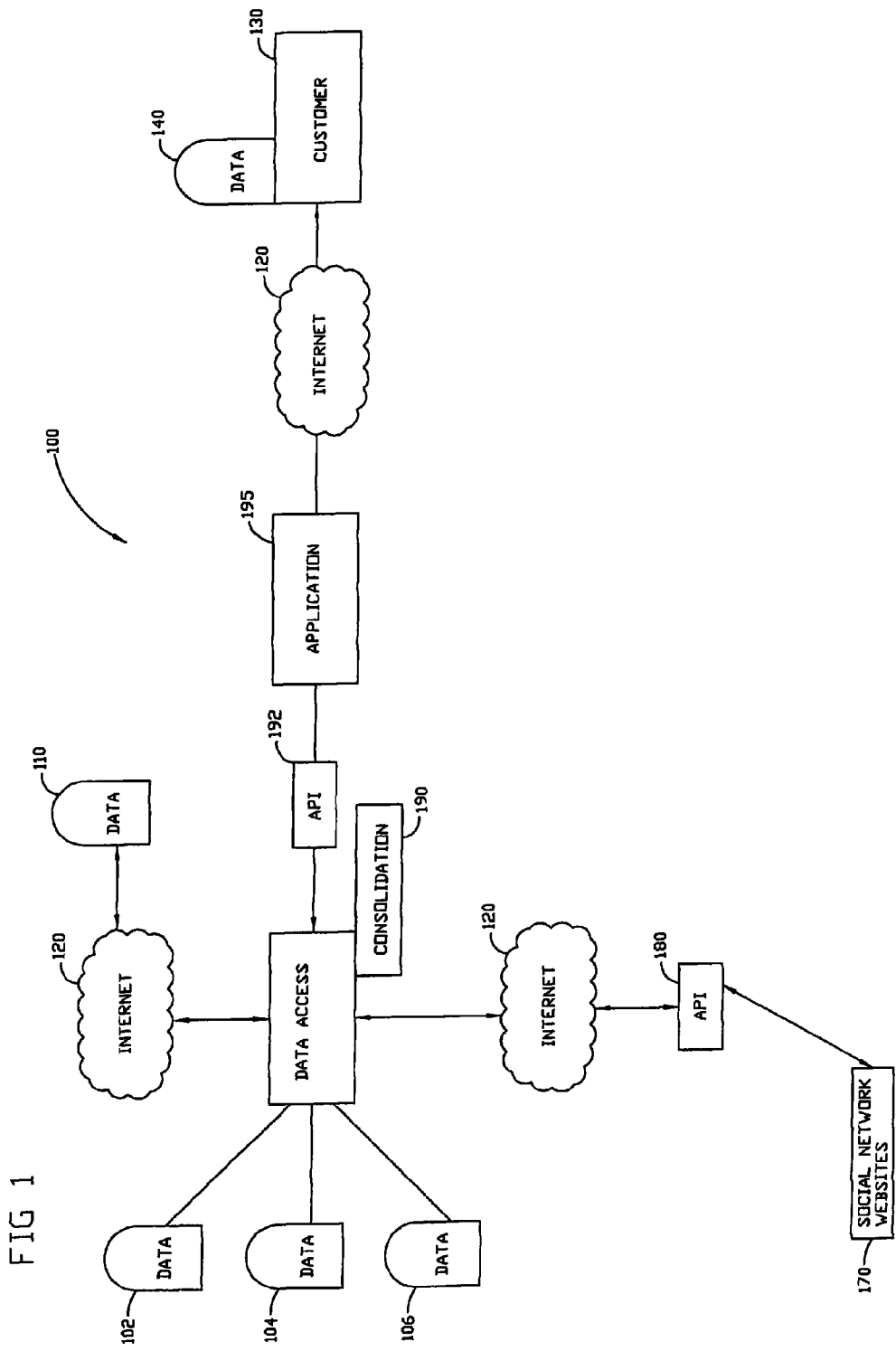
FIG. 1 shows a relational diagram of the system.

FIG. 1 shows a relational diagram of an internet based system 100 of tracking populations. The system 100 includes internal data storage 102, 104, 106. Internal data might include government and public data such as census data for example 102, customer and proprietary data 104 posted in the system 100 by customers for their exclusive use and national fee data 106 that can be used for a fee such as data provided by a data aggregator or a credit bureau for example and social network data 170. Fee data 106 might include data posted by a customer where that customer has agreed to provide the data to other customers for a fee. Data also includes other data 110 accessible through the Internet 120. Additionally a customer 130 using the system 100 over the Internet 120 might also bring their own data 140. The system 100 has access to various Internet based applications such as social networks 170 and can mine for data from these sources through applications 180 and the system 100 can consolidate 190 the data from these sources into a common platform so that diverse data in different formats and from different sources such as decentralized data 102, 104, 106, 110, 140, 170 can be pulled into a common usable format for purposes such as taking a community census, tracking criminal activity or for marketing for example. The data sets 102, 104, 106, 110, 140, and 170 might contain personal, financial, demographic and/or other information for example. FIG. 1 also shows that the system 100 can access other program applications 195 in real time and through an API 192 provide formatted information that can be added to a report generated by the system 100

Figure 2:
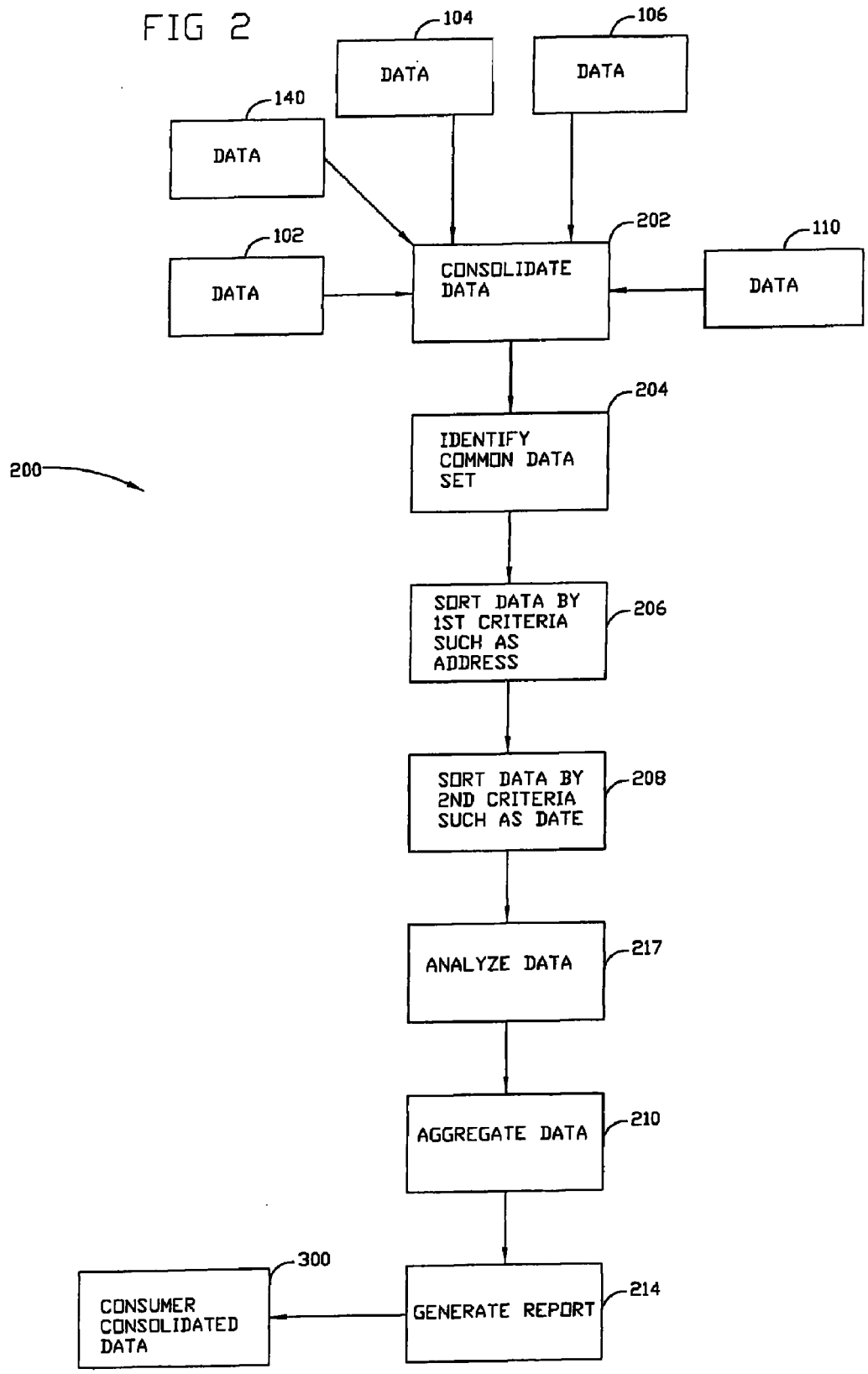
FIG. 2 shows a sample data flowchart.

FIG. 2 shows a specific example process 200 of how decentralized data might be used. In this example a customer is trying to determine the population of a city or other geographic region defined by customer input of latitude and longitude parameters. Several sources of possible data 102, 104, 106, 110 and 140 are identified. The decentralized data sets might be, for example, census data, phone bills, water bills and geographically based social network profiles. The data have criteria within each set. In the case of a city population we might be trying to determine if people live at a certain residential address. Census data might indicate that a family of four lived at the residence in the year 2000. Census data would be considered fairly reliable data but the data is dated and therefore might be suspect. Water bill data would also be available for the residence and if the water is currently turned on that would be strong recent evidence that someone is living in the house. The address on the water bill could be compared to an address in the census data if available. Phone records might also indicate who lives at the residence and the data would be fairly recent. If the data were cell phone data it might indicate a number of people. Phone and water bills are fairly current, perhaps a month or a few months old. Social network sites might also be scanned for the residence and for names identified in the other data. Social network data could be considered to be instant information. As used here a social network 170 can include any online service or computer network based service or website containing useful data about people, typical examples might include Internet sites designed to help people build social or professional networks among the site users. A set of data is consolidated 202 based on customer direction. Common data sets are identified 204, in the example above the common data sets might include the address of the residence, dates the data was collected, names and numbers of people. Some data sets may contain all the data fields of interest while others may only contain some of the data fields (See FIG. 4). The data is sorted 206 by a first criteria such as address and then sorted by a second criteria such as date and the data is aggregated 210 into a common database and then analyzed 217. A report is generated 214.

Figure 3:
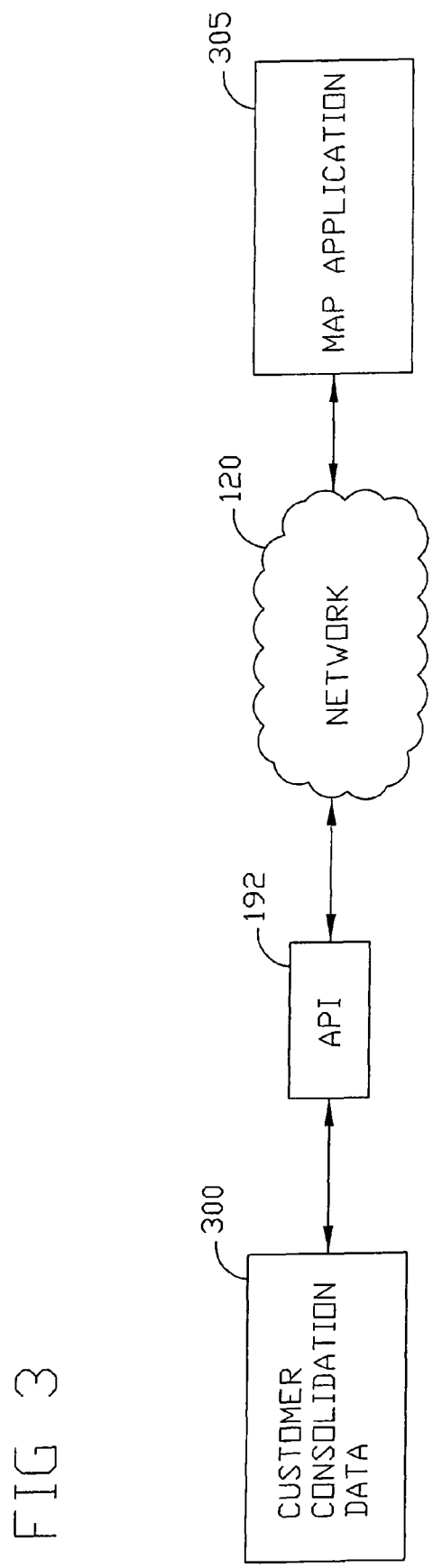
FIG. 3 shows an additional relational diagram.

FIG. 3 shows an example of how data might be treated by the customer using the system 100. There is a set of data 300 that is consolidated for a specific client. This might be the most up to date entire data for a metropolitan area for example. A customer can query this consolidated data 300 using a map application 305 through a network 120 such as the Internet and an API 192. This map application 305 allows the customer to query the data 300 in real time by moving pins 306 that control a geographic space for example, defined by latitude and longitude within the region represented by the customer's consolidated data. See FIG. 5 for a screen shot and additional information on the Map application 305.

FIG. 4 shows an example of how a specific data set might be handled by the system 100. The table 400 shows a list of data sources 402 including data sources from the cable company data 401, city data 403, phone company data 405, US postal service data 407, and data from a credit bureau 410. The table 400 is an example showing how a specific data set related to a specific address 420 location is compiled. In this case the address location is 613 Sandusky in a hypothetical city and the date is May 2009. The system 100 is being used to determine if there is actually a resident at this address 420. In this case each source contains data about if the address 420 is occupied. The data sets 401, 405 and 410 indicate that the address is occupied whereas the data sets 403 and 407 indicate it is not occupied. Giving the property a score 442 of 3 out of 5. The score of 3 out of 5 could be used to indicate a certain weighted probability that the residence is occupied. However each data set 401, 403, 405, 407 and 410 contain a date 440. Looking at the dates it can be seen that the data sets 403 and 407 that indicate not occupied either have an older date or no date whereas the 'yes' data are all recent. Given the weight data the system will assign a greater probability that the residence is occupied, probably near 100%. The system can also weight on factors others than date. For example the cable and phone data indicate that someone is spending money from that location and that might be given more weight than another process where a non-financial process is involved. Weights can be assigned for various reasons and the system 100 can learn.

Used for census data, FIG. 4 shows the process that would occur for each resident location within the geographic region such as a city. The individual weighted data for each specific location can be totaled and can be expressed in terms of confidence intervals. For example, the population of a certain neighborhood or city might be expressed as 25000 people with a confidence interval of +/−2 percent. If census data gives the population of the same city as 21600 the result of the system 100 might be used to dispute the census data.

The system 100 can be used for a variety of applications. In addition to census verification the data could be used to look at marketing questions, spending patterns, out shopping information, purchasing power and just about any demographic or economic question.

FIG. 5 shows how data sets 500 can be defined by the customer using a website based map 502. A geographic area such as a circle 504 can be defined on a map 502 about a geographic center 512. Customer usable markers such as pins 506 can be used to define the circle 504 area and data from households in the circle 504 area can be simultaneously displayed in table 510. A specific set of data 518 may be a customer target. For example the data in table 510 shows a household income in 2007 of $50,199. From a market research point of view a user customer may wonder what would happen to average income if a market campaign included a larger area. By moving a pin 506A the customer user gets an automatic change in the data 518, even as the pin is moving the data in table 510 will change to reflect the households currently in the area 504. Thus a customer could set a criteria that he wanted the largest market area possible so long as the average household income remained above $50000 and by moving the pins 506, 506A the user could achieve that result in real time. Through this interaction with the system the customer can generate their own report in real time to match their criteria. It will be clear that any set of data such as financial data, demographic data or political information for example could be optimized or analyzed using the map 502 with data sets 500, and that a user can work to a specific data target in real time.

In operation, a customer 130 can pay to have access to the system 100 through the Internet. The customer may have some data 140 of their own that they can enter into the system. The system 100 can be self service where the customer selects the data sets that they want to use and they pay accordingly. The customer can be prompted to make selections and to set up data queries to research questions. The system 100 provides access to a range of diverse, decentralized data in real time. This allows the customer to interact with the report and generate a report on the best available information at that time.

Although this application contains specific examples, it will be understood by those in the art that variations are possible.

The invention claimed is:

1. A computer implemented real time method for data collection including the steps of:
    collecting a first data set and storing the first data at an Internet accessible location;
    providing access to the stored first data set through the Internet;
    storing a second data set provided by a customer computer,
    accessing a third data set responsive to a customer request;
    sorting said first, second and third data sets by a first criteria wherein the first criteria is a geographic location;
    sorting the first, second and third data sets by a second criteria wherein said second criteria indicates age of the first, second and third data sets;
    aggregating data for a common geographic location;
    weighting the data from the first, second and third data sets based on the age of the data;
    providing a customer interactive report including demographic data within said location wherein said demographic data includes a confidence interval indicating the degree of likelihood that the demographic data is correct.

2. The method of claim 1 wherein the step of providing the report is controlled in real time by a customer by manipulating pins on a map that define the common geographic location.

3. The method of claim 1 wherein at least one of the data sets is social networking profile data, and the step of aggregating includes using social networking profile data based upon geography to inform a population count.

4. The method of claim 1 wherein the first data set is census data, the second data set is social media data from the Internet.

5. A computer implemented real time method for collecting population data including the steps of:
    collecting a first population data set and storing the first data at an Internet accessible location;
    providing access to the stored first data set through the Internet;
    storing a second data set provided by a customer computer,
    accessing a third data set responsive to a customer request;
    sorting said first, second and third data sets by a first criteria wherein the first criteria is a geographic location;
    sorting the first, second and third data sets by a second criteria wherein said second criteria indicates age of the first, second and third data sets;
    aggregating data for a common geographic location;
    weighting the data from the first, second and third data sets based on the age of the data;

providing a real time customer interactive report including demographic data within said location wherein said demographic data includes a confidence interval indicating the degree of likelihood that the demographic data is correct.

6. The method of claim 5 wherein the step of providing the real time report is controlled in real time by a customer by manipulating pins on an Internet based map that defines the common geographic location.

7. The method of claim 6 wherein the first data set is census data, the second data set is social media data from the Internet.

8. A computer implemented real time method for collecting demographic data including the steps of:
  collecting a first demographic data set and storing the first data at an Internet accessible location;
  providing access to the stored first data set through the Internet;
  storing a second data set provided by a customer computer,
  accessing a third data set responsive to a customer request;
  sorting said first, second and third data sets by a first criteria wherein the first criteria is a geographic location;
  sorting the first, second and third data sets by a second criteria wherein said second criteria indicates age of the first, second and third data sets;
  aggregating data for a common geographic location;
  weighting the data from the first, second and third data sets based on the age of the data;
  providing a real time customer interactive report including result data within said location wherein said result data includes a confidence interval indicating the degree of likelihood that the result data is correct.

9. The method of claim 8 wherein the step of providing the real time report is controlled in real time by allowing manually manipulating pins on an Internet based map to define the common geographic location.

10. The method of claim 9 wherein the first data set is census data, the second data set is social media data from the Internet.

* * * * *